(12) United States Patent
Hamm

(10) Patent No.: US 9,555,734 B2
(45) Date of Patent: Jan. 31, 2017

(54) CLOSED TOP, CORROSION-RESISTANT MOBILE STORAGE TANK

(71) Applicant: James Cleveland Hamm, Imperial, PA (US)

(72) Inventor: James Cleveland Hamm, Imperial, PA (US)

(*) Notice: Subject to any disclaimer, the term of this patent is extended or adjusted under 35 U.S.C. 154(b) by 0 days.

(21) Appl. No.: 14/838,655

(22) Filed: Aug. 28, 2015

(65) Prior Publication Data

US 2016/0059764 A1 Mar. 3, 2016

Related U.S. Application Data

(60) Provisional application No. 62/042,815, filed on Aug. 28, 2014.

(51) Int. Cl.
| | |
|---|---|
| *B65D 90/34* | (2006.01) |
| *B60P 3/22* | (2006.01) |
| *B65D 88/12* | (2006.01) |
| *B65D 90/10* | (2006.01) |
| *B65D 90/04* | (2006.01) |

(52) U.S. Cl.
CPC ............ *B60P 3/2215* (2013.01); *B65D 88/128* (2013.01); *B65D 90/041* (2013.01); *B65D 90/10* (2013.01); *B65D 90/34* (2013.01); *B65D 2590/0091* (2013.01); *B65D 2590/023* (2013.01)

(58) Field of Classification Search
CPC ........ B60P 3/2215; B60P 3/221; B65D 88/128
See application file for complete search history.

(56) References Cited

U.S. PATENT DOCUMENTS

| | | | |
|---|---|---|---|
| 3,341,215 A | 9/1967 | Spector | |
| 5,213,367 A | 5/1993 | Norman | |
| 5,320,247 A | 6/1994 | Sharp | |
| 5,979,686 A | 11/1999 | Dean | |
| 6,279,955 B1 | 8/2001 | Fisher | |
| 7,815,222 B2 * | 10/2010 | Markham | ............... B60P 3/224 280/837 |
| 8,215,516 B2 | 7/2012 | Kaupp | |

(Continued)

OTHER PUBLICATIONS

Kenter, Peter, The Future of Frac Tanks, Gas Oil &Mining Contractor, http://gomemag.com/editorial/2012/06/the_future_of_frac_tanks, last accessed Mar. 21, 2014.

*Primary Examiner* — Kevin Hurley
(74) *Attorney, Agent, or Firm* — Tucker Arensberg, P.C.

(57) ABSTRACT

The present disclosure provides for an above-ground mobile storage tank that can be used in a variety of different commercial applications. In one embodiment, the storage tank may comprise a tank shell, wherein the tank shell further comprises at least one floor wall, at least one top wall, and at least four side walls. The side walls may each be affixed to the floor wall and the top wall to from an interior tank space. Each of the wall panels may comprise a copolymer polypropylene material. The storage tank may also comprise a plurality of steel reinforcements, wherein each reinforcement is configured to encapsulate the tank shell. Each reinforcement may be affixed to a trailer, which is configured to transport the tank shell. The storage tank may also comprise a plurality of slip plates located on the trailer to enable the tank shell to "float" above the trailer.

5 Claims, 10 Drawing Sheets

(56) References Cited

U.S. PATENT DOCUMENTS

| | | |
|---|---|---|
| 8,261,930 B2 | 9/2012 | Satterfield |
| 8,434,682 B1 | 5/2013 | Argue |
| 8,955,711 B2 * | 2/2015 | Goad ............... B65D 90/04 220/1.6 |
| 9,283,883 B2 * | 3/2016 | Vaughn ............ B65D 88/54 |
| 2012/0138630 A1 | 6/2012 | Kinsey |
| 2012/0175098 A1 | 7/2012 | Guarrero |
| 2013/0001224 A1 | 1/2013 | Payne |
| 2015/0115589 A1 * | 4/2015 | Thiessen ........... B60P 3/2295 280/837 |
| 2015/0128880 A1 * | 5/2015 | Hoffman ........... F28D 1/0213 122/15.1 |

* cited by examiner

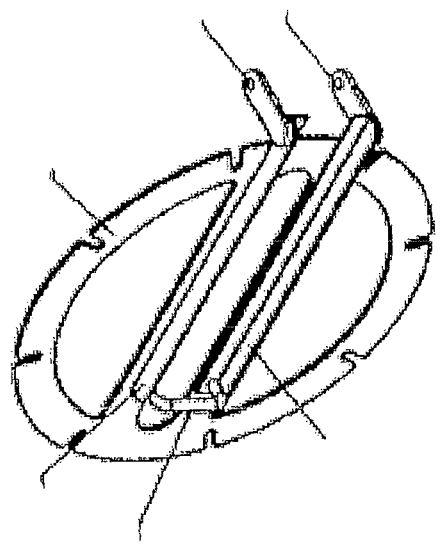
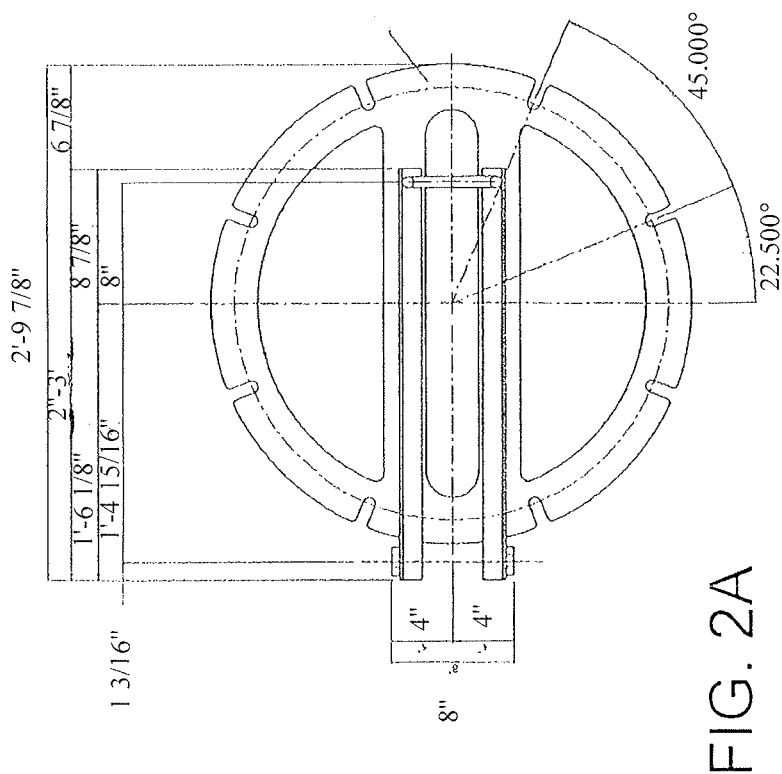
FIG. 2B
FIG. 2A

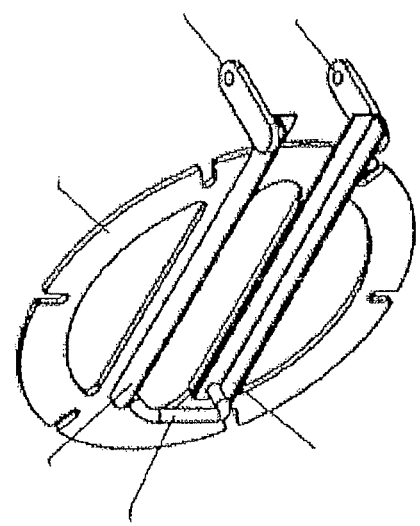
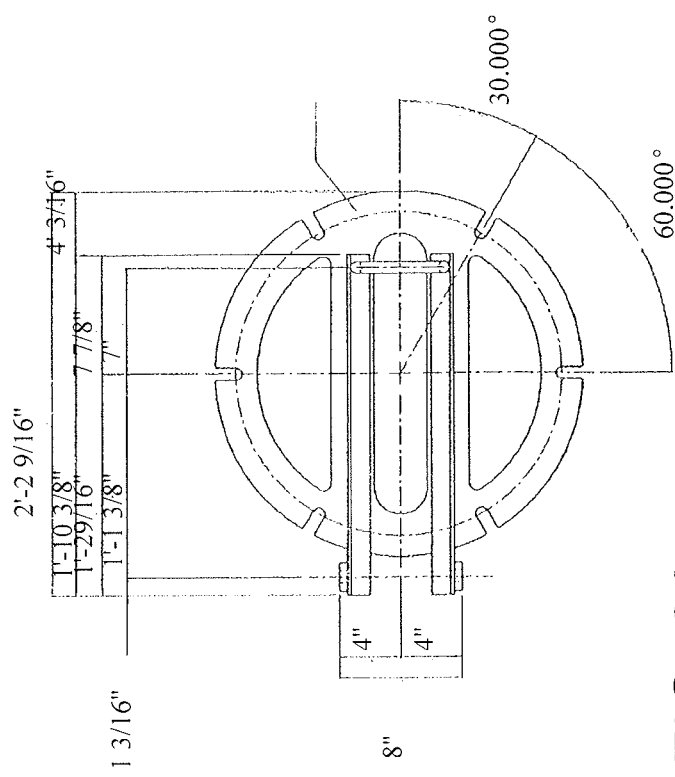

FIG. 5

HO POLYETHYLENE SHIM/SLIP PLATE ARRANGEMENT
PLACE AT BOTTOM OF MOBILE LIQUID STORAGE TANK

CLOSED TOP, CORROSION-RESISTANT MOBILE STORAGE TANK

RELATED APPLICATIONS

This Application claims priority under 35 U.S.C. §119(e) to provisional patent application No. 62/042,815, entitled "Closed Top, Corrosion-Resistant Mobile Storage Tank," filed on Aug. 28, 2014, which is hereby incorporated by reference in its entirety.

BACKGROUND

Large scale mobile storage tanks are used in a variety of different commercial applications including oil and gas (for hydraulic fracturing, "fracing"), environmental, municipal, industrial, and waste water treatment and removal. Currently, these storage tanks are constructed from materials such as carbon steel or stainless steel. Due to the chemicals used in various industrial processes including fracing, these steel storage tanks are prone to corrosion, breakdown, and decay. In the case of carbon steel storage tanks, efforts have been made to coat the tanks with materials such as an industrial paint (for example, a carboline paint) or rubber. Applying these coatings results in a storage tank that is not homogenous (the coating and the underlying steel tank). These coated storage tanks are unable to withstand the use of corrosive chemicals, causing the coatings to wear and breakdown, leading to corrosion of the tank shell. These coated storage tanks also do not allow for the expansion and contraction of the tank shell itself. Stainless steel tanks are not coated at all, and corrosion of the tank due to exposure to chemicals is inevitable.

There exists a need for a corrosion-resistant storage tank that is capable of withstanding the use of these chemicals. The storage tank of the present disclosure overcomes the limitations of the prior art by providing a, corrosion-resistant mobile storage tank constructed from a copolymer polypropylene. Constructing the storage tank using a copolymer polypropylene also provides for a storage tank that is lighter, lower cost, and more flexible than current tank designs.

Currently, steel storage tanks are designed with a straight-line mid-mixing pipeline. In such design, if a valve external to the storage tank is left open, is faulty, or is degraded, there is a risk that the contents of the entire storage tank, including potentially harmful chemicals used in the industrial processes, will drain out. It would be advantageous if the corrosion-resistant storage tank could also incorporate a safety feature into its pipeline to prevent the emptying of the entire tank. The storage tank of the present disclosure may also overcome the limitations of the prior art by providing a "u" shaped mid-mixing pipeline.

Currently, storage tanks are configured with an apex "v" shaped bottom, but a flat top. Because storage tanks are used in a variety of different climates, including those with harsh winters, these flat tops present the risk of accumulating large amounts of rain water and snow. It would be advantageous if the corrosion-resistant storage tank was also designed to prevent the accumulation of rain and snow. Because commercial applications often require the use of a large number of storage tanks, it would also be advantageous if the corrosion-resistant storage tank also maintained the general geometry of storage tanks currently being used, namely rectangular, closed-top tanks. This would enable integration of the superior storage tanks into the industry while maintaining continuity among the size and shape of the various storage tanks. The storage tank of the present disclosure overcomes the limitations of the prior art by providing a tank design with both an apex "v" shaped top and bottom.

SUMMARY

The present disclosure provides for an above-ground mobile storage tank that can be used in a variety of different commercial applications. In one embodiment, the storage tank may comprise a tank shell, wherein the tank shell further comprises at least one floor wall, at least one top wall, and at least four side walls. The side walls may each be affixed to the floor wall and the top wall to from an interior tank space. Each of the wall panels may comprise a copolymer polypropylene material. The storage tank may further comprise at least one pipeline with a "u" design housed within the tank shell. A plurality of steel reinforcements may be configured to encapsulate the tank shell and be affixed to a trailer.

BRIEF DESCRIPTION OF THE DRAWINGS

The accompanying drawings, which are included to provide further understanding of the disclosure and are incorporated in and constitute a part of this specification illustrate embodiments of the disclosure, and together with the description, serve to explain the principles of the disclosure.

In the drawings:

FIG. 2A is illustrative of a manway door design of a storage tank of the present disclosure.

FIG. 2B is illustrative of steel reinforcements of a manway door design of a storage tank of the present disclosure.

FIG. 3A is illustrative of a view port assembly of a storage tank of the present disclosure.

FIG. 3B is illustrative of a door design of a view port assembly of a storage tank of the present disclosure.

FIG. 5 is illustrative of a mechanism for affixing a plurality of reinforcements to a trailer comprising the use of steel pins.

DETAILED DESCRIPTION

Reference will now be made in detail to the embodiments of the present disclosure, examples of which are illustrated in the accompanying drawings. Wherever possible, the same reference numbers will be used throughout the specification to refer to the same or like parts.

Figure 1A:
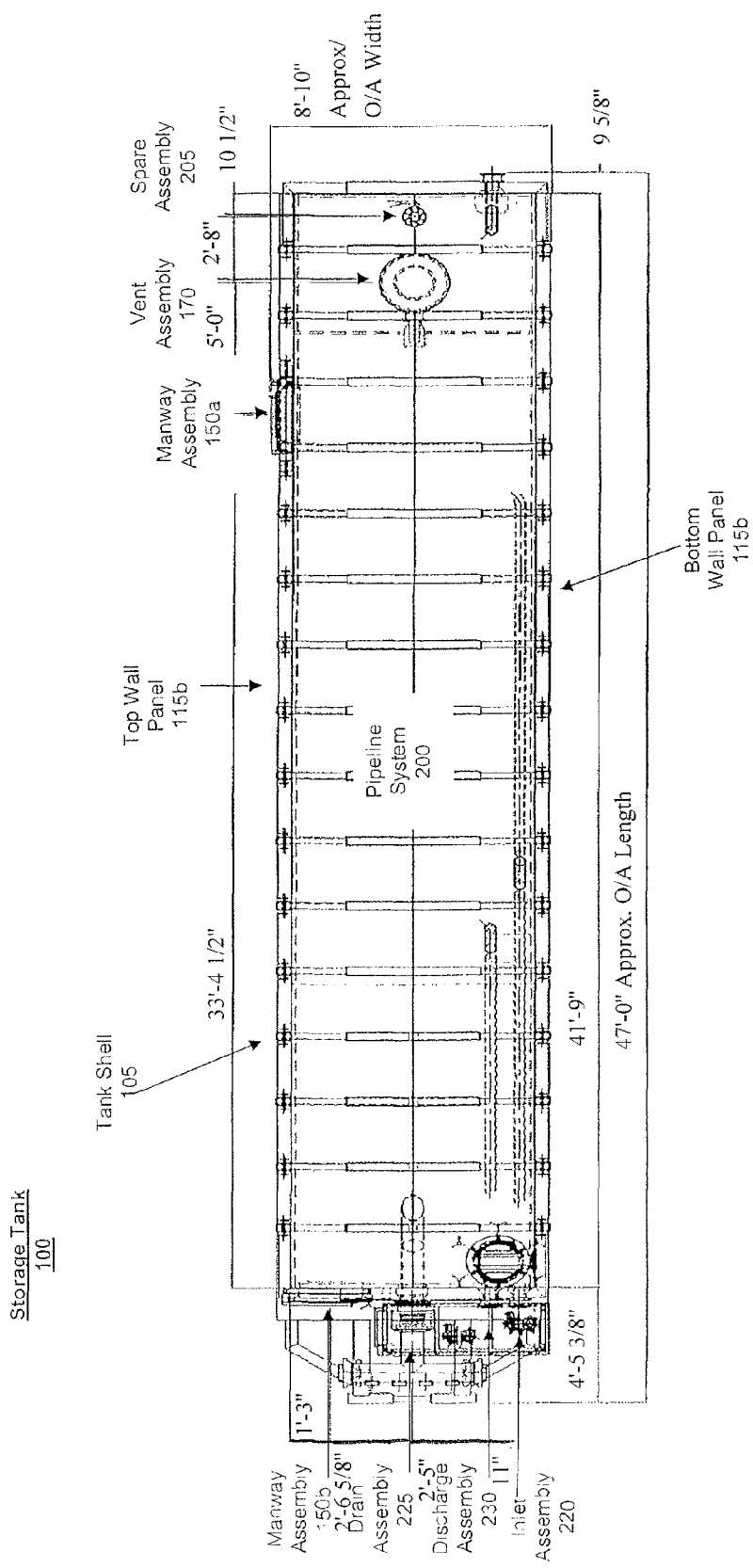
FIG. 1A is illustrative of a storage tank of the present disclosure.
Figure 1B:
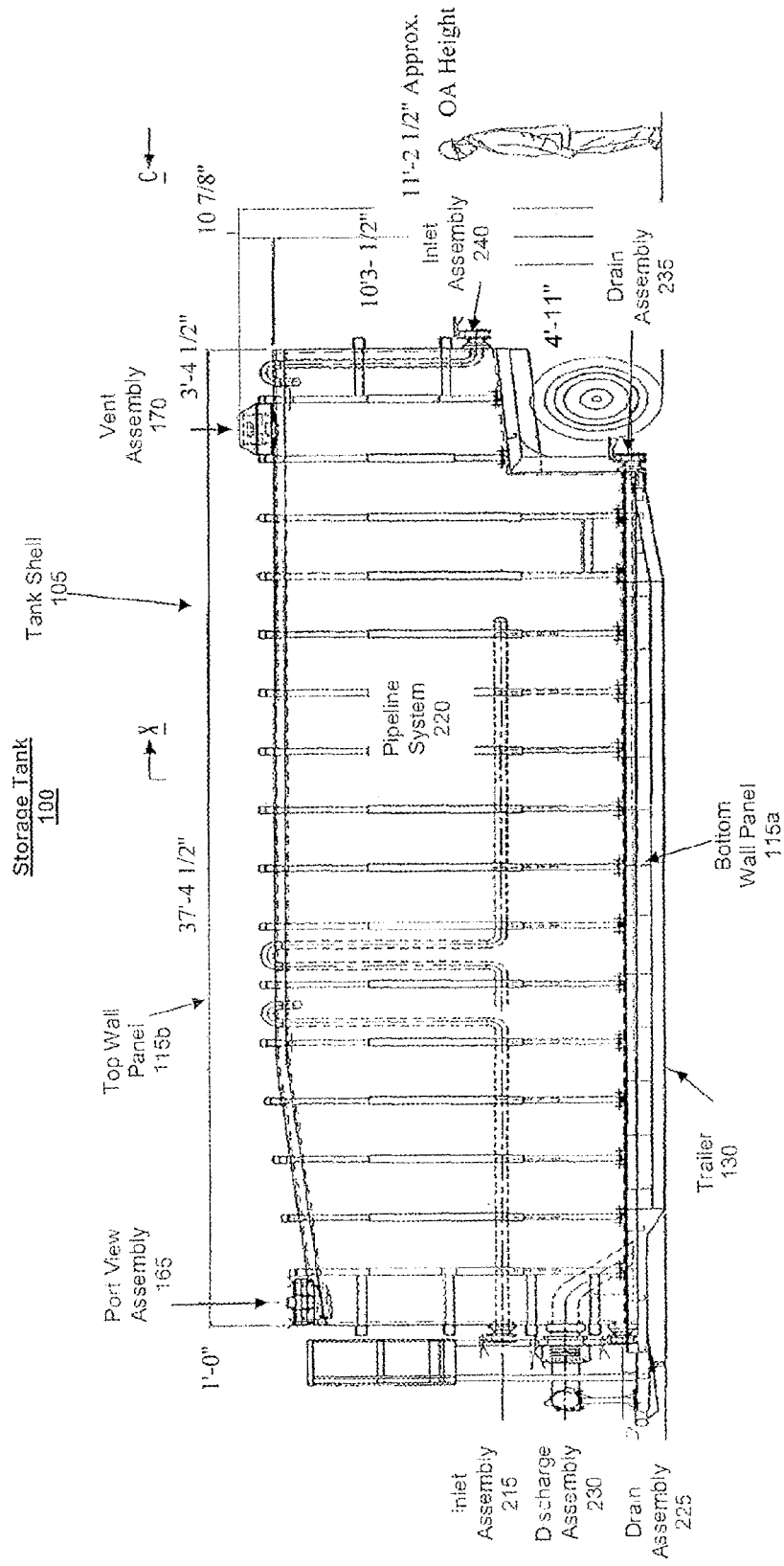
FIG. 1B is illustrative of a storage tank of the present disclosure.
Figure 1C:
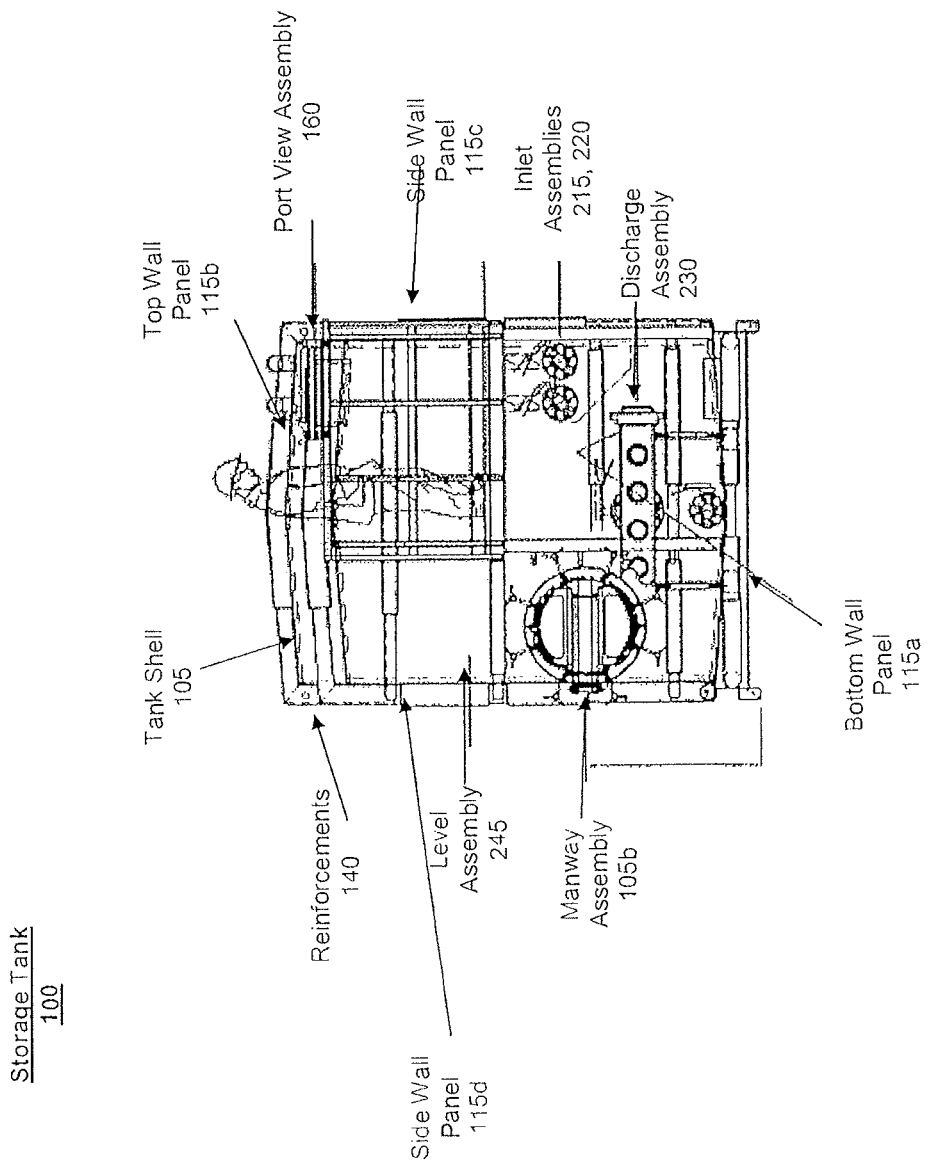
FIG. 1C is illustrative of a storage tank of the present disclosure.
Figure 1D:
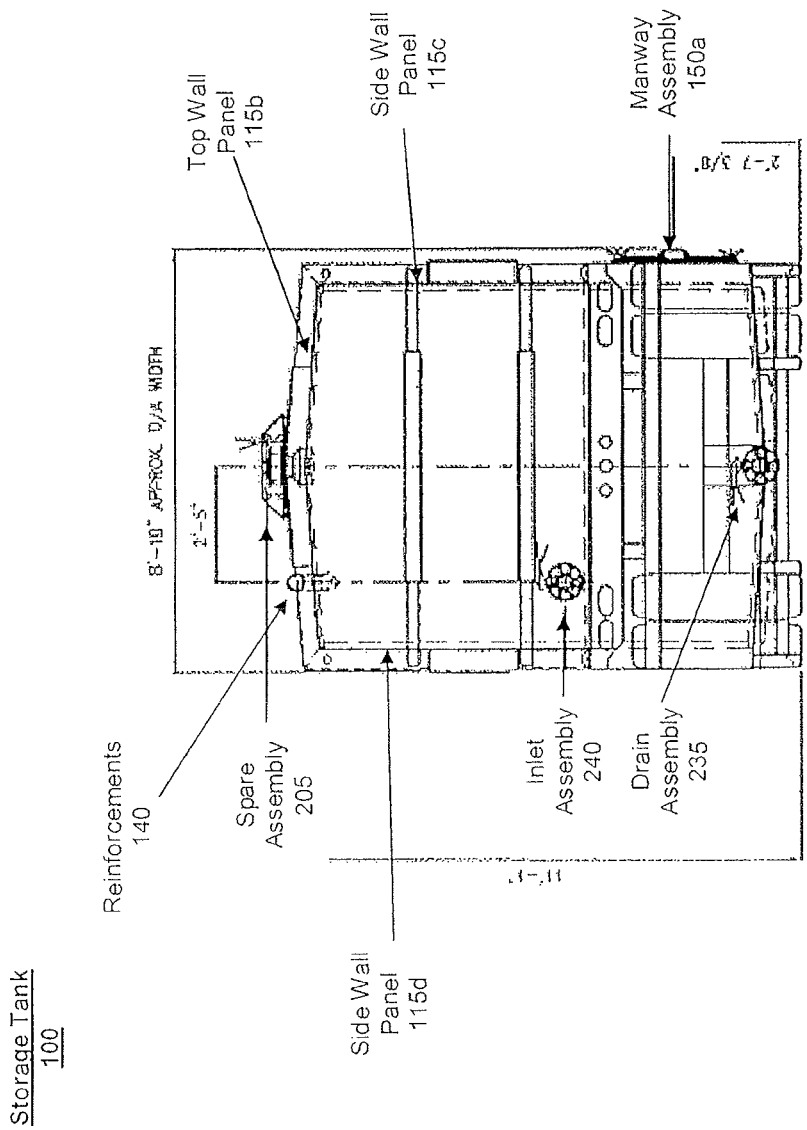
FIG. 1D is illustrative of a storage tank of the present disclosure.
Figure 1E:
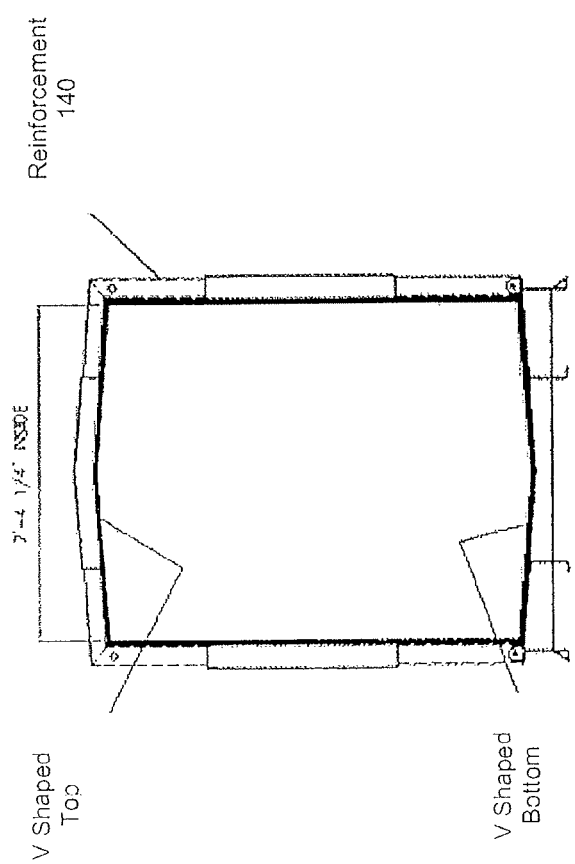
FIG. 1E is illustrative of a storage tank of the present disclosure.

The present disclosure provides for a storage tank, one embodiment of which is illustrated by various views in FIGS. 1A-1E. The storage tank 100 may comprise a tank shell 105 and at least one pipeline system 200 housed within the tank shell 105. In one embodiment, the tank shell 105 may comprise at least one floor wall panel 115*a*, at least one top wall panel 115*b*, and at least four side wall panels (two of which are illustrated in FIGS. 1C-1D as 115*c* and 115*d*). Each side wall panel may be affixed to each of the top wall panel 115*b* and the floor wall panel 115*a* to form an interior tank space. The present disclosure contemplates a variety of different methods known in the art may be used to affix the various panels. For example, different welding techniques such as plastic welding, automated fusion welding, machine welding, manual hand welding, and extrusion welding may be used. The present disclosure also contemplates that the tank may comprise a radius vertical corner to add additional strength to the storage tank 100 design. For example, a six inch radius vertical corner may be used to give the tank edges a rounded design. This design is advantageous over the prior art which utilizes 90° welded corners.

In one embodiment, at least one of the top panels 115*b* and the bottom panels 115*a* are configured so as to form an apex "v" shape. Such a design holds potential for protecting the tank shell 105 from the effects of weather, including rain and snow. The present disclosure also contemplates that rather than constructing the interior tank space using a plurality of individual panels, one or more panels may be constructed so as to bend to form the various edges of the tank interior. In one embodiment, each of the wall panels may comprise a copolymer polypropylene material. In another embodiment, a different thermoplastic copolymer or similar homogenous material may be used to construct the panels.

The pipeline system 200 may include a mid-mixing pipeline. The storage tank of the present disclosure provides for a "u" shaped mid-mixing pipeline as opposed to a straight-line mid-mixing pipeline as is currently used in the art. The "u" shaped pipeline is designed so as to have at least one location in the pipeline comprising a "u" shape. Using a "u" shaped pipeline provides an anti-ciphering feature, equipping the storage tank with an inherent safety mechanism. Such a design prevents all contents of the storage tank 100 from being emptied should an external valve be left open, become faulty, or be degraded. In a "u" pipeline design, only the contents in the pipe itself would drain out of the tank 100, thereby reducing the amount of chemicals or other hazardous materials released into the surrounding environment. Any sufficient mechanism known in the art may be used to support the pipe.

The various pipelines may be connected to one or more inlet or discharge assemblies to enable chemicals, water and other fluids and materials to be input or discharged from the interior of the tank shell. For example, the storage tank may comprise one or more tank fills configured so as to enable chemicals to be introduced into and mixed with the contents of the tank shell 105. In one embodiment, the storage tank 100 of the present disclosure may comprise at least two tank fills, one at either end of the tank shell 105. A plurality of drains may also be incorporated into the storage tank 100 design and configured so as to drain the contents of the tank shell 105. In one embodiment, the use of a plurality of drains enables the contents of the tank shell to be emptied more quickly than by using one drain alone. This is beneficial in various commercial applications in which chemicals need to be administered to a site quickly. These assemblies are further illustrated in the Figures.

These drain and inlet assemblies are further illustrated by FIGS. 1A-1D. Referring to the Figures, the tank shell may comprise at least one discharge assembly 230 configured to release the contents of the storage tank and various inlet assemblies including: at least one front/top inlet assembly 215, at least one front/mid inlet assembly 220, and at least one rear/top inlet assembly 240. These inlet assemblies may be configured to introduce chemicals, fluids, or other materials into the interior of the tank shell. The tank shell may also comprise a front drain assembly 225 and a rear spare drain assembly 235 configured for draining the contents of the tank shell.

Because it can be challenging to add connections to a storage tank 100 once it has left the manufacturing floor, the storage tank 100 of the present disclosure may also comprise at least one rear spare assembly 205. Because the other inlet and drain assemblies may have dedicated functions, the inclusion of this rear spare assembly provides added flexibility and customization potential to the storage tank 100. The storage tank 100 may also comprise a level assembly 245, which is illustrated in FIG. 1C. This level assembly 245 may comprise at least one of a platform, a ladder, a walkway, and handrails as needed to enable an individual access to various parts of the storage tank for maintenance, monitoring, or repair.

Referring again to FIGS. 1A-1D, The storage tank 100 may also comprise one or more manway assemblies, illustrated as 150*a* and 150*b* in the Figures, which may be configured so as to be entry points or access points to the interior of the storage tank 100. In one embodiment, the present disclosure contemplates a novel design for manway doors 150*a* and 150*b* as illustrated in FIGS. 2A-2B. In one embodiment, the manway doors 150*a* and 150*b* may comprise a notched design and be constructed from the same copolymer polypropylene material as the tank shell 105. In an embodiment where a different thermoplastic copolymer or similar material is used to construct the tank shell, the manway door 150*a* and 150*b* may be comprised of the same material.

Like the tank shell, the manway doors 150*a* and 150*b* may be reinforced with steel frames 140. The steel reinforcements can be used to provide a stable surface for affixing the door 150*a* and 150*b* to the tank shell 105. Such a design holds potential for providing a more secure and tighter seal of the manway door 150*a* and 150*b* than if copolymer polypropylene was used alone. These reinforcements are illustrated in FIG. 2B.

Referring again to FIG. 1A-1D, the storage tank 100 of the present disclosure may also comprise one or more level indicators, over flows, and other mechanisms for monitoring the level of its contents. In addition, the storage tank may further comprise at least one view port assembly 165 in the tank shell 105. The view port assembly 165 enables an individual to visually inspect the interior of the storage tank 100 and ascertain the level of its contents. The view port assembly 165 is advantageous because it provides a means for visually inspecting the interior of an otherwise opaque tank shell 105. The view port assembly door 165 is illustrated in more detail in FIGS. 3A-3B. FIG. 3A illustrates one embodiment featuring a notched design. The view port assembly 165 is shown with an associated mechanism for affixing the view port assembly door 165 may be affixed to the tank shell 105, such as one or more bolts. In one embodiment, the view port assembly door 165 may comprise a copolymer polypropylene material. The view port assembly door 165 may further comprise steel reinforcements, illustrated by FIG. 3B, to provide a more secure seal when affixing the view port assembly door 165 to the tank shell 105.

Figure 4B:
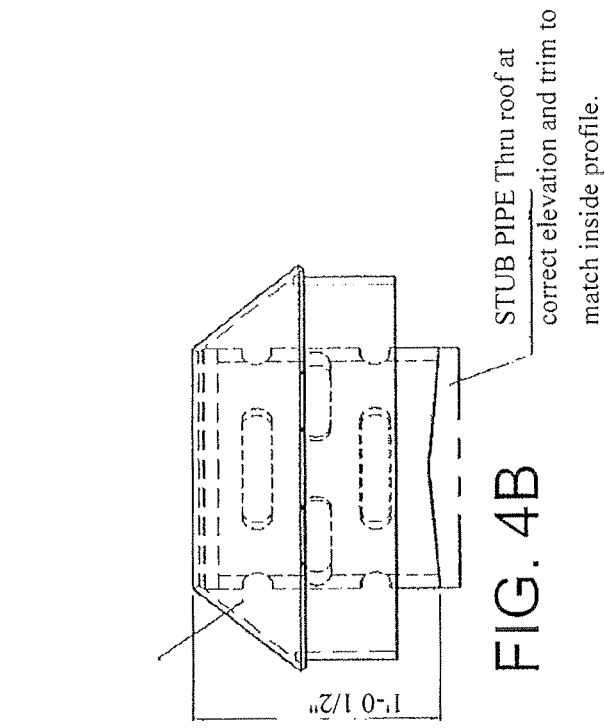
FIG. 4B is illustrative of a vent assembly of a storage tank of the present disclosure.
Figure 4A:
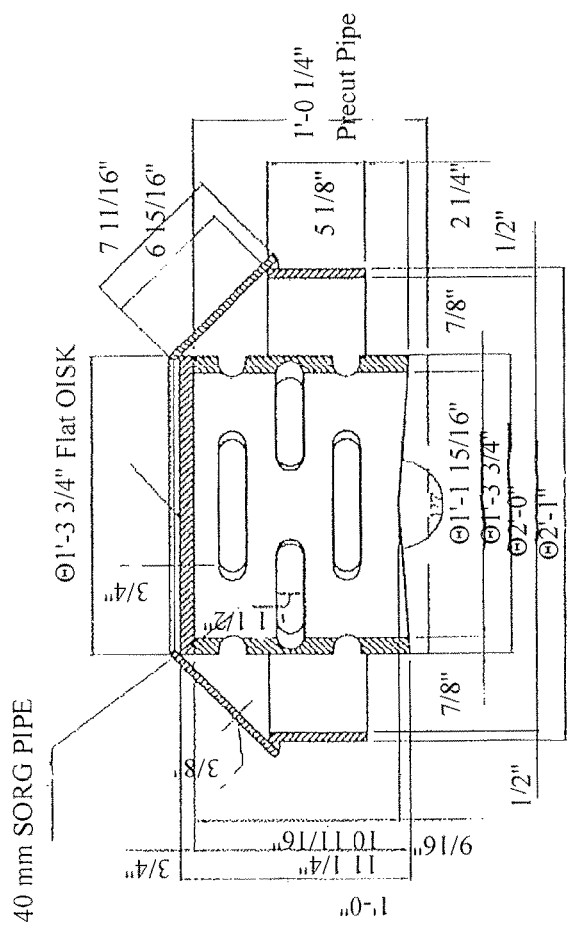
FIG. 4A is illustrative of a vent assembly of a storage tank of the present disclosure.

The tank shell 105 may also comprise a vent assembly 170, which is illustrated in more detail in FIGS. 4A-4B. As can be seen from the Figures, the vent assembly 170 is a fixed vent. This means that even though the storage tank 100 is a "closed top" storage tank, the vent 170 is always open and the tank shell 105 is not under pressure. This is different from current designs where the vent only opens due to pressure built up from within the tank shell.

Constructing the storage tank 100 of the present disclosure using a copolymer polypropylene material provides many benefits over the prior art including corrosion-resistance and allowing the tank shell 105 to expand and contract. While the use of a copolymer polypropylene material provides significant benefits, it also requires a specialized knowledge of specific design features that must be implemented in the storage tank 100.

The storage tank 100 of the present disclosure may address these design features by providing for a plurality of reinforcements 140 and mechanisms that allow for the expansion and contraction of the tank shell 105. The present disclosure contemplates that any number of reinforcements necessary to for a specific tank design may be used and this disclosure is not limited to any certain number of reinforcements. These reinforcements 140 are more fully illustrated by FIG. 1E. In one embodiment, the storage tank 100 of the present disclosure may provide for a plurality of reinforcements 140 configured to encapsulate the tank shell 105. These reinforcements 140, may be made of steel. As can be seen from the Figures, these reinforcements 140 may be constructed so as to have an apex "v" design, mirroring the design of the tank shell itself 105. At least a portion of each steel reinforcement 140 may be encapsulated with one or more materials to prevent the corrosion of these steel reinforcements 140. In one embodiment, this coating material may comprise polyurethane. It is important to note that the use of polyurethane is sufficient for the reinforcements 140 because the reinforcements 140 are not in direct contact with the corrosive chemicals in the interior of the tank shell 105. Further a plurality of encaps can be used in conjunction with the reinforcements and coated using the same material to provide for the same protective properties.

In one embodiment, illustrated by FIG. 1B, the storage tank 100 of the present disclosure may further comprise a trailer 130. In one embodiment, a trailer 130 of the present disclosure may further comprise a "v" shaped notch design. Such a design enables the apex "v" shaped bottom wall panel to fit securely within the "v" shaped cavity of the trailer 130. As can be seen from the Figures, the trailer 130 may be configured so as to comprise a plurality of "clips." These clips may be configured so as to affix each end of each reinforcement to the trailer 130, thereby enabling the reinforcements to encapsulate the tank shell 105 and provide stability and support to the overall design.

Figure 5:
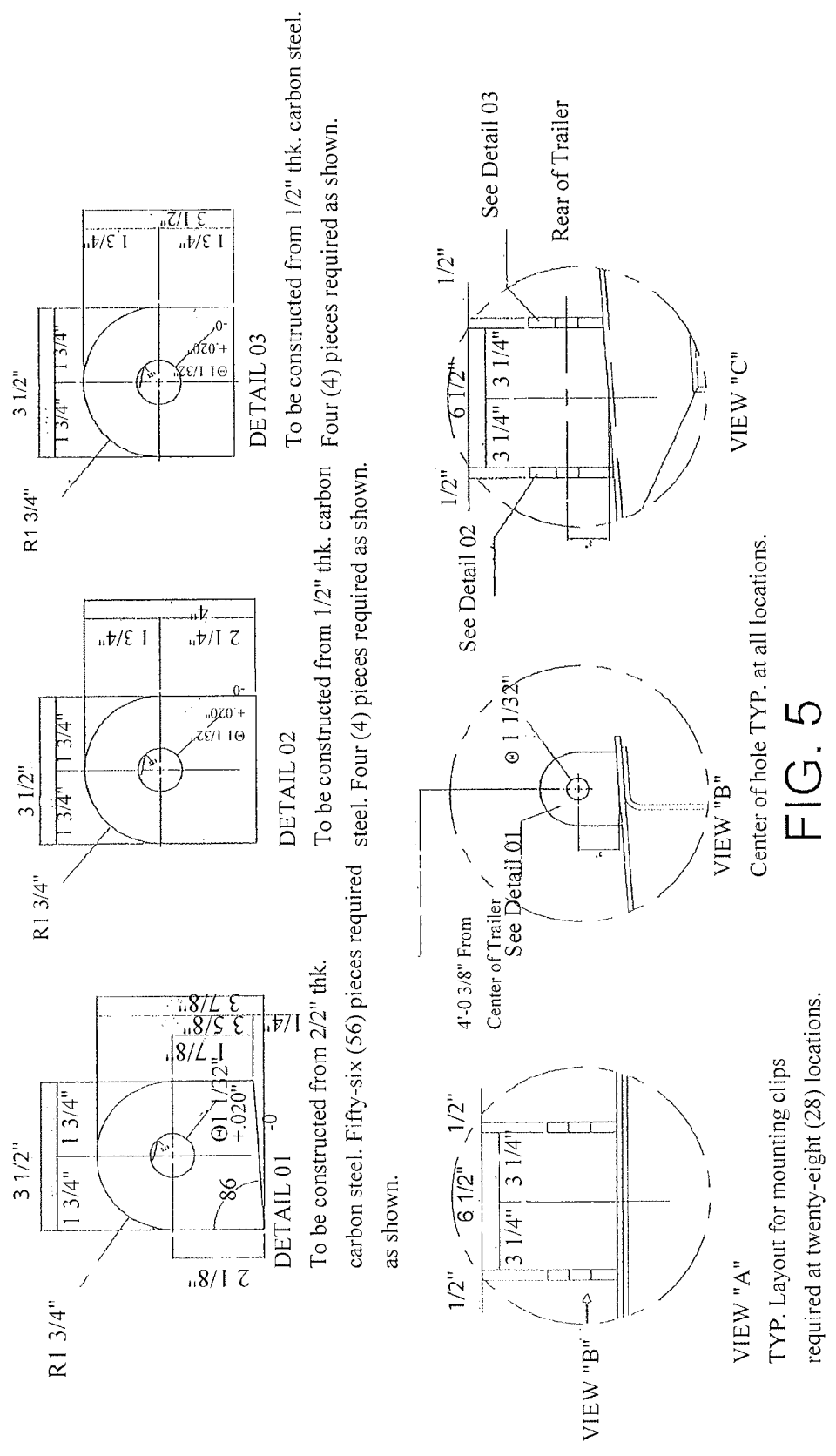

FIG. 5 illustrates a detailed view of this clipping mechanism. In one embodiment, a plurality of pins may be used to affix the reinforcements 140 to the clips of the trailer 130. In one embodiment, the pins may engage through an eye bolt assembly. The present disclosure contemplates other similar mechanisms may be used. It is important that the diameter of these pins be sufficiently smaller than the opening of each clip to thereby allow for movement within the joint formed by affixing the reinforcement to the trailer 130. This movement is necessary to allow for the expansion and contraction of the tank shell 105.

This clipping mechanism is also unique in the art. Currently, storage tanks are welded or otherwise permanently affixed to the trailers used to transport them. In such a design, the storage tank cannot be separated from the trailer. Therefore, when a storage tank needs replaced, the entire unit, including the trailer must be replaced. Such a design also fails to allow for expansion or contraction of the tank shell, which is critical in a design where the tank shell comprises a copolymer polypropylene.

The storage tank 100 of the present disclosure overcomes the limitations of the prior art by providing a "floating" tank shell 105 design. A floating design is a cost-effective solution for when a tank shell needs to be replaced. Because the tank shell is not welded or otherwise permanently affixed to the trailer, but rather "floats" on top of the trailer and is secured using reinforcements, the tank shell can be removed from the trailer for replacement or repair if needed. The trailer 130 can be reused, preventing the need to purchase a new trailer. In addition, the floating design allows for the expansion and contraction of the tank shell 105 itself.

Figure 6:
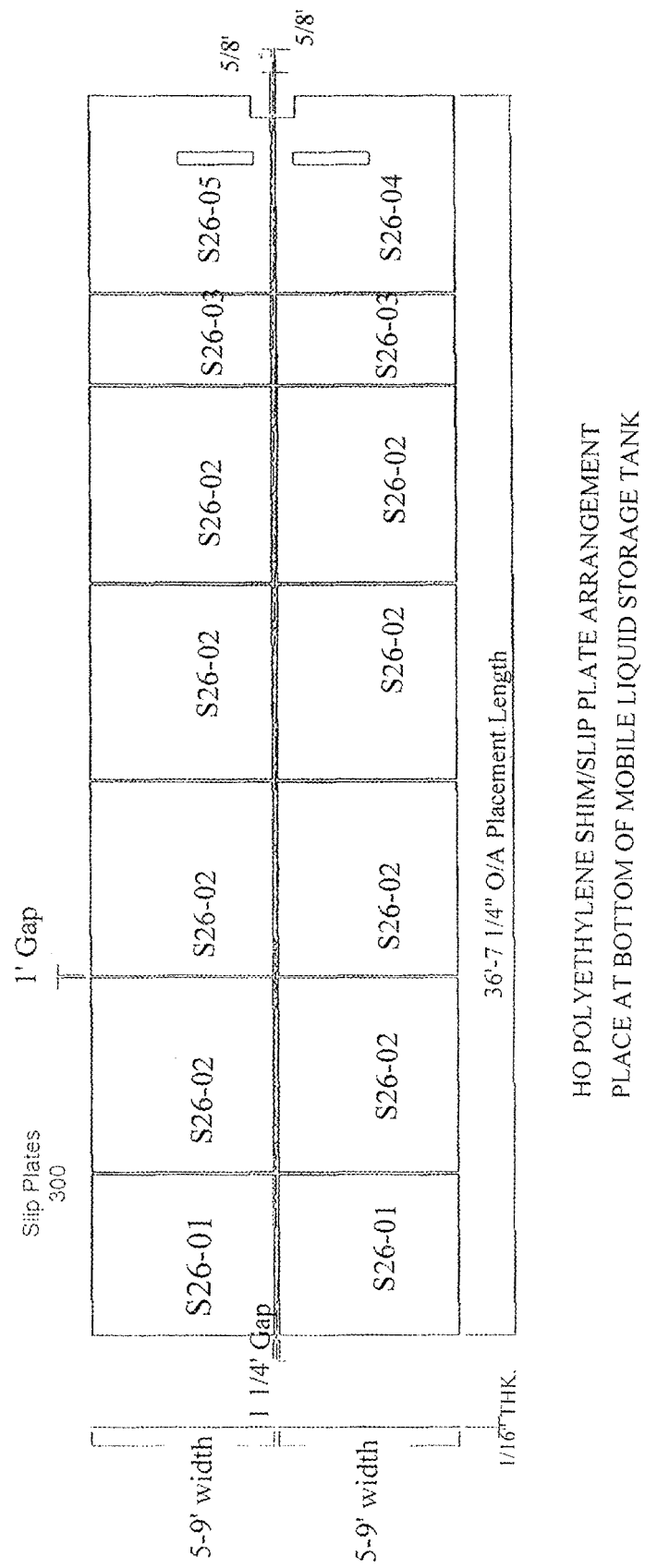
FIG. 6 is illustrative of a slip plate arrangement of a storage tank of the present disclosure.

The storage tank 100 of the present disclosure may also comprise one or more slip plates as illustrated in FIG. 6. The tank shell 105 may rest on top of these slip plates 300 which are affixed to a trailer 130. These slip plates further allow for movement of the tank shell 105, including for expansion and contraction of the shell 105 itself. In one embodiment, the slip plates 300 may comprise polyethylene. However, the storage tank 100 of the present disclosure is not limited to the use of polyethylene, and it is contemplated that in other embodiments ultra-high-molecular-weight polyethylene ("UHMW") or any similar material with a sufficiently low friction coefficient may be used.

The present disclosure contemplates that the storage tank 100 described herein can be used in a wide variety of different commercial applications, including industrial use (for example, to temporality store acid or chemicals at a steel mill), at a chemical plant, in a municipal application, or any other operational environment where it is necessary or beneficial to store acids, chemicals, or other hazardous or corrosive materials. Not all embodiments of the storage tank may require all of the piping and inlet/drain assemblies needed for use in the oil and gas industries. Therefore, in one embodiment, the storage tank 100 of the present disclosure may comprise a tank shell 105 comprising: at least one bottom wall panel 115b, at least one top wall panel 115a, and at least four side wall panels 115c-115f, wherein each wall panel is further affixed to each of the bottom wall panel 115a and the top wall panel 115b to form an interior tank space, and wherein each panel further comprises a copolymer polypropylene material; at least one trailer 130 configured to transport the tank shell 105; at least one slip plate affixed to the top surface of the trailer and upon which the tank shell sits to enable movement of the tank shell 105; and at least one steel reinforcement configured so as to encapsulate the tank shell 105 and wherein each steel reinforcement 140 is affixed to the trailer 130.

While the disclosure has been described in detail in reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed its:

1. A storage tank comprising:
   a tank shell comprising:
   at least one bottom wall panel, at least one top wall panel configured to have an apex "v" design, and at least four side wall panels, wherein each wall panel is further affixed to each of the bottom wall panel and the top wall panel to form an interior tank space, and wherein each panel further comprises a copolymer polypropylene material;

at least one manway assembly, configured to operate as an access point to the tank shell, wherein the manway assembly further comprises a door comprised of at least one copolymer polypropylene material and at least one steel reinforcement wherein the steel reinforcement is affixed to the tank shell;

at least one pipeline system housed within the tank shell comprising at least one inlet assembly and at least one drain assembly, wherein at least one of the pipeline systems comprise a "u" shape design;

at least one trailer configured to transport the tank shell;

at least one slip plate affixed to the top surface of the trailer and upon which the tank shell sits to enable movement of the tank shell; and at least one steel reinforcement configured so as to encapsulate the tank shell and wherein each steel reinforcement is affixed to the trailer.

2. The storage tank of claim 1 wherein the tank shell further comprises at least one fixed vent.

3. The storage tank of claim 1 further comprising at least one platform.

4. The storage tank of claim 1 further comprising at least one ladder.

5. The storage tank of claim 1 further comprising at least one handrail.

* * * * *